United States Patent
Iwanaga et al.

(10) Patent No.: US 10,432,067 B2
(45) Date of Patent: Oct. 1, 2019

(54) ELECTRIC MOTOR

(71) Applicants: DENSO CORPORATION, Kariya, Aichi-pref. (JP); ASMO CO., LTD., Kosai, Shizuoka-pref. (JP)

(72) Inventors: Taishi Iwanaga, Toyohashi (JP); Shigeki Uchiyama, Hamamatsu (JP); Takehide Omura, Hamamatsu (JP); Takuya Saito, Hamamatsu (JP); Takehiko Ohshita, Iwata (JP)

(73) Assignees: DENSO CORPORATION, Kariya (JP); ASMO CO., LTD., Kosai (JP)

( * ) Notice: Subject to any disclaimer, the term of this patent is extended or adjusted under 35 U.S.C. 154(b) by 60 days.

(21) Appl. No.: 15/752,738

(22) PCT Filed: Aug. 12, 2016

(86) PCT No.: PCT/JP2016/073746
§ 371 (c)(1),
(2) Date: Feb. 14, 2018

(87) PCT Pub. No.: WO2017/030088
PCT Pub. Date: Feb. 23, 2017

(65) Prior Publication Data
US 2018/0248449 A1    Aug. 30, 2018

(30) Foreign Application Priority Data
Aug. 19, 2015  (JP) .................................. 2015-162119

(51) Int. Cl.
*H02K 11/02* (2016.01)
*H02K 29/08* (2006.01)
(Continued)

(52) U.S. Cl.
CPC ............. *H02K 11/02* (2013.01); *H02K 5/225* (2013.01); *H02K 11/215* (2016.01); *H02K 11/33* (2016.01); *H02K 29/08* (2013.01); *H02K 1/2786* (2013.01)

(58) Field of Classification Search
CPC ...... H02K 11/02; H02K 11/215; H02K 11/33; H02K 5/22; H02K 29/08; H02K 5/225; H02K 1/2786
See application file for complete search history.

(56) References Cited

U.S. PATENT DOCUMENTS

| | | | | |
|---|---|---|---|---|
| 6,320,288 B1* | 11/2001 | Suzuki | .................... | H02K 29/08 310/67 R |
| 2010/0019704 A1* | 1/2010 | Ueda | ......................... | H02P 6/10 318/400.3 |
| 2013/0193787 A1* | 8/2013 | Sahara | ...................... | H02K 9/22 310/64 |

FOREIGN PATENT DOCUMENTS

| JP | H08-047285 A | 2/1996 |
|---|---|---|
| JP | 2013-158069 A | 8/2013 |

(Continued)

OTHER PUBLICATIONS

Oct. 25, 2016 International Search Report submitted within International Patent Application No. PCT/JP2016/073746.

*Primary Examiner* — Naishadh N Desai
(74) *Attorney, Agent, or Firm* — Oliff PLC (57) ABSTRACT

A control circuit controls, based on detection values of Hall-effect sensors, an inverter circuit to activate a rotor. After the activation of the rotor, the control circuit controls the rotational speed of the rotor based on the detection value of the Hall-effect sensor. A sensor pin is arranged in a slot between a forward-wound portion and a reverse-wound portion of a U-phase winding. A sensor pin is arranged in a slot between a forward-wound portion and a reverse-wound (Continued)

portion of a V-phase winding. A sensor pin is located on one side in an axial direction with respect to the reverse-wound portion of the U-phase winding. The sensor pins are located respectively at two first positions.

11 Claims, 7 Drawing Sheets

(51) Int. Cl.
*H02K 11/215* (2016.01)
*H02K 11/33* (2016.01)
*H02K 5/22* (2006.01)
*H02K 1/27* (2006.01)

(56) References Cited

FOREIGN PATENT DOCUMENTS

| | | |
|---|---|---|
| JP | 2015-100221 A | 5/2015 |
| WO | 00/42696 A1 | 7/2000 |

* cited by examiner

ELECTRIC MOTOR

CROSS-REFERENCE

This is a U.S. National Stage of International Patent Application No. PCT/JP2016/073746, filed Aug. 12, 2016, which in turn claims the benefit of Japanese Patent Application No. 2015-162119 filed Aug. 19, 2015. The disclosure of the prior applications are hereby incorporated by reference herein their entirety.

TECHNICAL FIELD

The present invention relates to electric motors.

BACKGROUND ART

Conventionally, there is known a three-phase synchronous motor which includes a rotor having a plurality of magnetic poles and a stator coil arranged radially inside the rotor (see, for example, Patent Document 1).

In the three-phase synchronous motor, there are arranged three magnetic sensors on one axial side of the stator coil. Between a plurality of permanent magnets and the three magnetic sensors, there are provided three magnetic guide members that guide magnetic flux, which emanates from the plurality of magnetic poles of the rotor, respectively to the three magnetic sensors. Hence, to detect the rotational speed and rotational direction of the rotor, each of the three magnetic sensors detects the magnetic flux guided by a corresponding one of the three magnetic guide members.

Moreover, in a general three-phase synchronous motor, to rotate the rotor, there are employed an inverter circuit and a control circuit which are not described in Patent Document 1. To rotate the rotor, the inverter circuit outputs three-phase alternating current to the stator coil, thereby causing the stator coil to create a rotating magnetic field.

The control circuit detects the position of the rotor based on detection signals of the three magnetic sensors. Then, based on the detected position, the control circuit controls the inverter circuit, causing the three-phase alternating current to be outputted from the inverter circuit to the stator coil. Consequently, based on the three-phase alternating current, the stator coil provides the rotating magnetic field to the plurality of magnetic poles of the rotor. As a result, the rotor rotates in sync with the rotating magnetic field.

Here, the three magnetic sensors are mounted on a circuit board. The circuit board is arranged on the one axial side of the stator coil. The three magnetic sensors and the three magnetic guide members are arranged within a region (angular range) of 120 degrees in mechanical angle. Consequently, it is possible to arrange the three magnetic sensors within a small region.

PRIOR ART LITERATURE

Patent Literature

[PATENT DOCUMENT 1] Japanese Patent Application Publication No. JP2013158069A

SUMMARY OF THE INVENTION

Problems to be Solved by the Invention

In the motor described in Patent Document 1, upon intrusion of electromagnetic noise or the like into wires between the control circuit and the three magnetic sensors, the control circuit may erroneously control the inverter circuit. In this case, malfunction of the rotor may be caused depending on the three-phase alternating current outputted from the inverter circuit to the three-phase stator coil.

Hence, the inventor of the present application has focused his attention on suppressing intrusion of electromagnetic noise or the like into the wires between the control circuit and the three magnetic sensors, and investigated arranging the three magnetic sensors within an even smaller region so as to shorten the lengths of the wires between the control circuit and the three magnetic sensors.

In view of the above, the present invention aims to provide an electric motor in which three magnetic sensors are arranged within an even smaller region.

Means for Solving the Problems

An electric motor according to the present disclosure comprising:

a rotor (50) having a plurality of magnetic poles arranged in a circumferential direction and being configured to be rotatable about an axis (S1);

a stator coil (49) including phase windings (49a, 49b, 49c) of a plurality of phases, the phase windings constituting, for each phase, a forward-wound portion (46) in which an electric wire is wound in a forward winding direction and a reverse-wound portion (47) in which the electric wire is wound in a reverse direction to the forward winding direction, the forward-wound and reverse-wound portions of the plurality of phases being arranged in the circumferential direction;

a substrate (60) having a drive circuit (62), a control circuit (63) and three magnetic sensors (61a, 61b, 61c) mounted thereon, the drive circuit being configured to output, for rotating the rotor, alternating current to the stator coil and thereby cause a rotating magnetic field to be outputted from the stator coil to the plurality of magnetic poles, the control circuit being configured to control the drive circuit, the three magnetic sensors being configured to detect, for detecting rotation of the rotor, magnetic flux from the plurality of magnetic poles; and three guide members (81, 82, 83) provided to guide the magnetic flux emanating from the plurality of magnetic poles respectively to the three magnetic sensors, at least one of the three guide members being arranged at a first position where magnetic fluxes respectively emanating from one pair of the forward-wound and reverse-wound portions of the same phase are canceled by each other, at least one of the three guide members other than the at least one guide member arranged at the first position being arranged at a second position, the second position being different from the first position, wherein the control circuit controls, based on detection values of the three magnetic sensors, the drive circuit to activate the rotor, and after completion of the activation of the rotor, the control circuit controls rotational speed of the rotor based on detection values of at least one of the three magnetic sensors which detects the magnetic flux guided by the at least one guide member arranged at the first position.

With the above configuration, in controlling the rotational speed of the rotor, the control circuit uses the detection values of the at least one of the three magnetic sensors which detects the magnetic flux guided by the at least one guide member arranged at the first position. Therefore, it is possible to accurately control the rotational speed of the rotor. Moreover, the at least one of the three guide members other than the at least one guide member arranged at the first position is arranged at the second position that is different from the first position. Therefore, compared to the case of arranging all the three guide members respectively at three first positions, it is possible to arrange the three guide members within an even smaller region. Consequently, it is possible to arrange the three magnetic sensors within an even smaller region.

Hereinafter, mechanical angle is angle centering on the axis (S1) of the rotor when the three magnetic sensors and the three guide members are viewed in an axial direction of the rotor. The axial direction is a direction in which the axis of the rotor extends. One side in the axial direction is one side in the direction in which the axis of the rotor extends. The other side in the axial direction is the other side in the direction in which the axis of the rotor extends.

Specifically, in embodiments, the three magnetic sensors and the three guide members are arranged within a region (angular range) of 60 degrees in mechanical angle.

In addition, the reference sign in parentheses of each means described in this section indicates the correspondence with concrete means described in the following embodiments.

EMBODIMENTS FOR CARRYING OUT THE INVENTION

Hereinafter, embodiments of the present invention will be described with reference to the drawings. In addition, in the following embodiments, for the sake of simplifying explanation, identical or equivalent parts are given the same reference signs in the drawings.

(First Embodiment)

An in-vehicle motor 1 according to a first embodiment will be described with reference to FIGS. 1 and 2.

The in-vehicle motor 1 according to the present embodiment is for configuring an electric fan of an in-vehicle cooling module. The in-vehicle cooling module is installed in an engine compartment of a motor vehicle to cool a capacitor and a radiator with wind sent from the electric fan and/or natural wind during traveling of the vehicle.

The in-vehicle motor 1 is a three-phase synchronous motor. As shown in FIG. 1, the in-vehicle motor 1 includes a base 10, a rotor shaft 20, bearings 30A and 30B, a stator 40, a rotor 50, a circuit board 60, a connector 70 and a case 80.

The base 10 is formed of a metal material into a plate shape. The base 10 includes an opening formation portion 12 for forming an opening 11 that opens in an axial direction. The base 10 supports the rotor shaft 20, the circuit board 60 and the connector 70.

The rotor shaft 20 is formed of a metal material into a rod shape. The rotor shaft 20 is a supporting shaft that extends from the base 10 in a direction (i.e., the upward direction in FIG. 1) perpendicular to the major surface extending direction of the base 10. The rotor shaft 20 is supported by the base 10. Hereinafter, the lower side in FIG. 1 will be referred to as one side in the axial direction of the rotor shaft 20; the upper side in FIG. 1 will be referred to as the other side in the axial direction of the rotor shaft 20.

The bearings 30A and 30B are arranged close to an end of the rotor shaft 20 on the other side in the axial direction. The bearings 30A and 30B are aligned in the axial direction. The bearings 30A and 30B are arranged within a central recess 53 of a rotor case 51. The bearings 30A and 30B are supported by the rotor shaft 20 and rotatably support an inner circumferential surface 53a of the central recess 53 of the rotor case 51.

The stator 40 is arranged on the other side in the axial direction with respect to the base 10. The stator 40 is supported by the base 10. As shown in FIG. 2, the stator 40 includes a stator core 41.

The stator core 41 includes an annular portion 42 and teeth 43a, 43b, 43c, 43d, 43e, 43f, 44a, 44b, 44c, 44d, 44e and 44f.

The annular portion 42 is formed in the shape of a ring centering on the axis of the rotor shaft 20. The annular portion 42 is supported by the rotor shaft 20.

The teeth 43a, 43b, 43c, 43d, 43e, 43f, 44a, 44b, 44c, 44d, 44e and 44f are formed to protrude radially outward from the annular portion 42. The teeth 43a, 43b, 44f are arranged at equal intervals in a circumferential direction of the rotor shaft 20.

That is, the teeth 43a, 43b, 44f are formed to protrude from the annular portion 42 in a radial fashion. Between every adjacent two of the teeth 43a, 43b, 44f, there is formed one slot 48. In the present embodiment, in the stator core 41, there are formed a total of twelve slots 48.

Here, the teeth 43a and 44a are arranged adjacent to each other in the circumferential direction. The circumferential direction is the direction of a circumference centering on the axis of the rotor shaft 20. The teeth 43b and 44b are arranged adjacent to each other in the circumferential direction. The teeth 43c and 44c are arranged adjacent to each other in the circumferential direction. The teeth 43d and 44d are arranged adjacent to each other in the circumferential direction. The teeth 43e and 44e are arranged adjacent to each other in the circumferential direction. The teeth 43f and 44f are arranged adjacent to each other in the circumferential direction.

On the teeth 43a, 43b, 43c, 43d, 43e and 43f, there are provided forward-wound portions (first wound portions) 46 that are formed of windings 45A-45F of copper wires (electric wires) wound in a forward winding direction (first winding direction).

On the teeth 44a, 44b, 44c, 44d, 44e and 44f, there are provided reverse-wound portions (second wound portions) 47 that are formed of windings 45A-45F of copper wires (electric wires) wound in a reverse winding direction (second winding direction).

In the present embodiment, the forward winding direction is defined as the clockwise direction as viewed from the center of the stator core 41 toward the distal end of each tooth; the reverse winding direction, which is reverse to the forward winding direction, is defined as the counterclockwise direction as viewed from the center of the stator core 41 toward the distal end of each tooth. Portions of the windings 45A-45F which connect the forward-wound portions 46 and the reverse-wound portions 47 constitute bridging wires (not shown).

Figure 7:
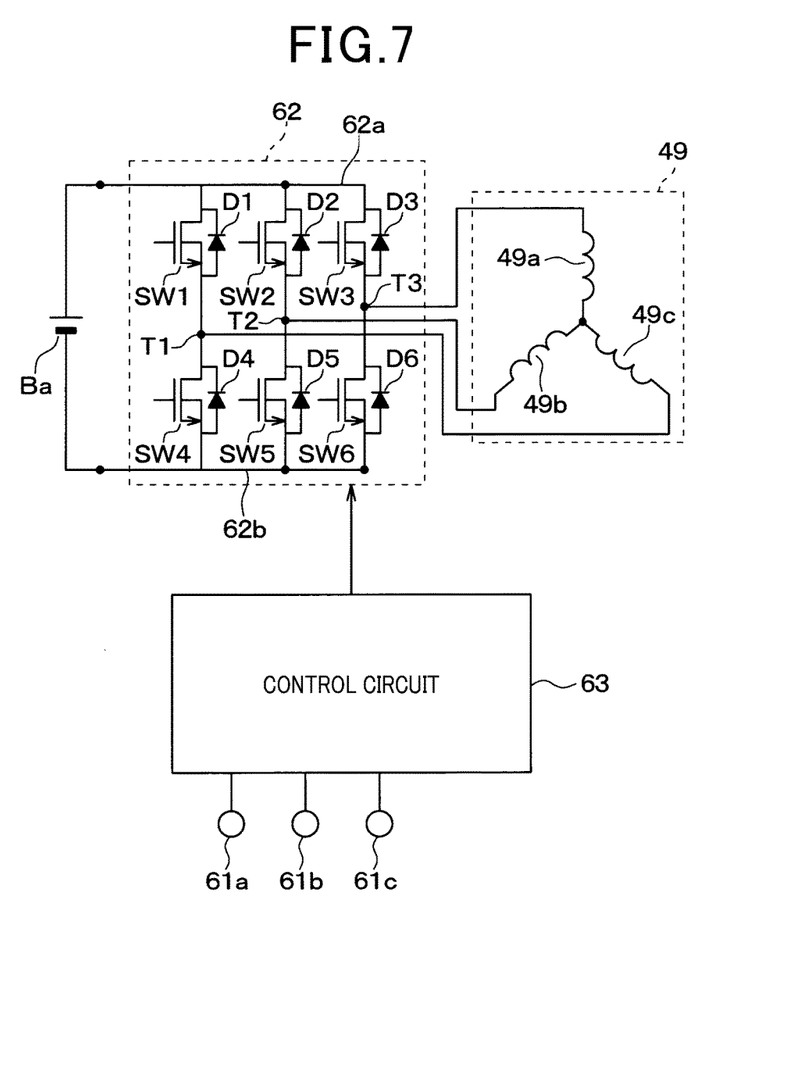
FIG. 7 is an electric circuit diagram illustrating the electric circuit configuration of the in-vehicle motor according to the first embodiment.

The windings 45A and 45D are serially connected to constitute a U-phase winding 49a (see FIG. 7). The windings 45B and 45E are serially connected to constitute a V-phase winding 49b. The windings 45C and 45F are serially connected to constitute a W-phase winding 49c.

That is, those forward-wound portions 46 and reverse-wound portions 47 which are formed of the windings 45A and 45D constitute the U-phase winding 49a. Those forward-wound portions 46 and reverse-wound portions 47 which are formed of the windings 45B and 45E constitute the V-phase winding 49b. Those forward-wound portions 46 and reverse-wound portions 47 which are formed of the windings 45C and 45F constitute the W-phase winding 49c.

Consequently, each pair of the forward-wound and reverse-wound portions 46 and 47 of the U-phase are arranged so as to be adjacent to each other in the circumferential direction. Each pair of the forward-wound and reverse-wound portions 46 and 47 of the V-phase are arranged so as to be adjacent to each other in the circumferential direction. Each pair of the forward-wound and reverse-wound portions 46 and 47 of the W-phase are arranged so as to be adjacent to each other in the circumferential direction.

As above, each pair of the forward-wound and reverse-wound portions 46 and 47 of the same phase are arranged so as to be adjacent to each other in the circumferential direction.

In the present embodiment, as shown in FIG. 7, the U-phase winding 49a, the V-phase winding 49b and the W-phase winding 49c are star-connected to constitute a stator coil 49.

Figure 1:
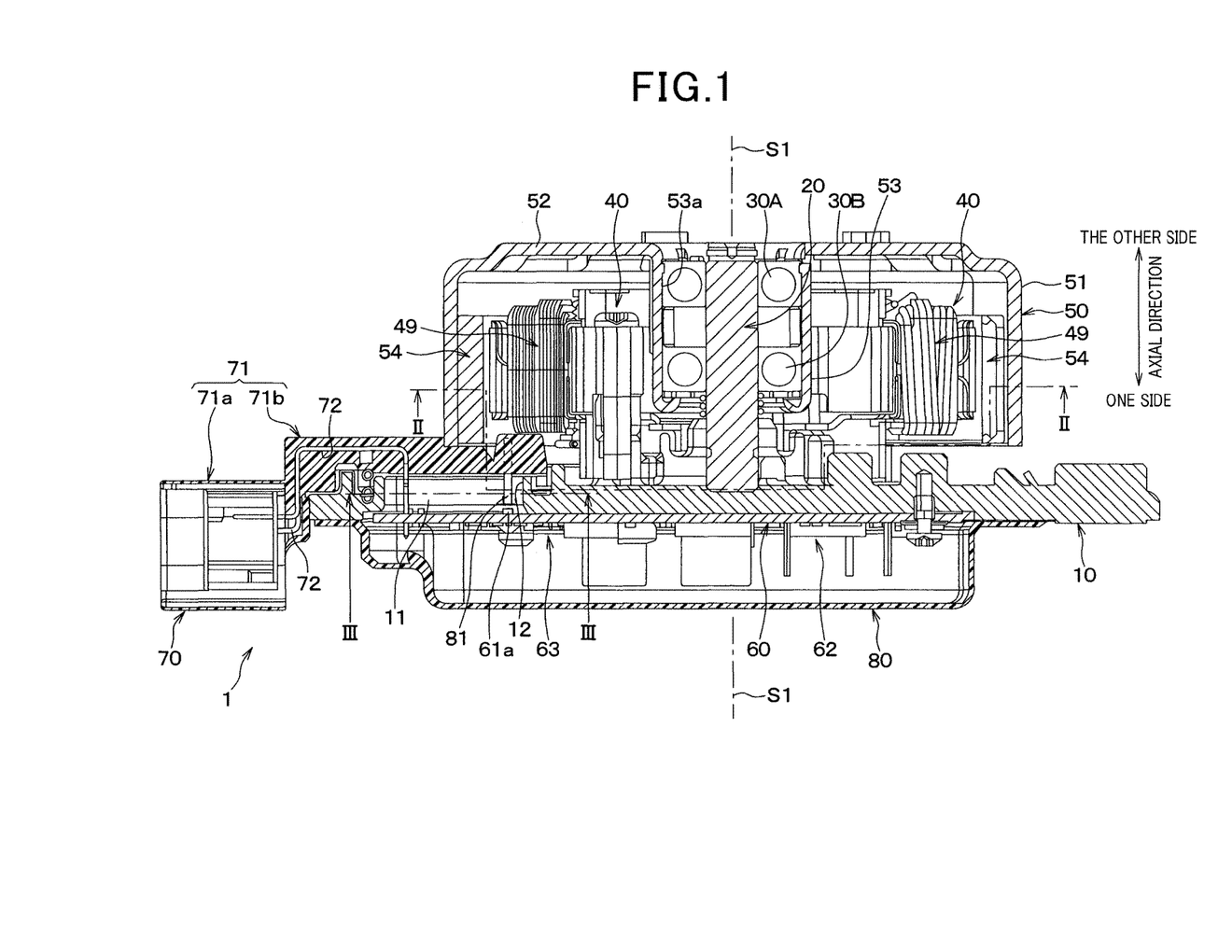
FIG. 1 is a cross-sectional view illustrating the overall configuration of an in-vehicle motor according to a first embodiment.

As shown in FIG. 1, the rotor 50 includes the rotor case 51. The rotor case 51 is formed in a cylindrical shape. The rotor case 51 is formed so that its axis coincides with the axis Si of the rotor shaft 20.

Therefore, the rotor case 51 (i.e., the rotor 50) rotates about the axis S1 of the rotor shaft 20. In the present embodiment, the axis Si of the rotor shaft 20 corresponds to the axis of a rotor according to the present invention. The rotor case 51 receives the stator 40. In the rotor case 51, there is provided a lid portion 52 to cover an opening on the other side in the axial direction.

In a radially central part of the lid portion 52, there is formed the central recess 53 that is recessed toward the one side in the axial direction. The rotor shaft 20 penetrates a bottom part of the central recess 53 in the axial direction. The inner circumferential surface 53a of the central recess 53 is rotatably supported by the rotor shaft 20 via the bearings 30A and 30B.

On an inner circumferential surface of the rotor case 51, there are fixed a plurality of permanent magnets 54. The plurality of permanent magnets 54 form a plurality of magnetic poles on the radially inner side thereof. The plurality of permanent magnets 54 are arranged in the circumferential direction so that the polarities of the magnetic poles alternately change in the order of S pole→N pole→S pole→N pole. Consequently, in the rotor 50 (i.e., on the inner peripheral side of the rotor case 51), there are formed the plurality of magnetic poles that are arranged in the circumferential direction. In the present embodiment, there are arranged twelve permanent magnets 54.

The circuit board 60 is arranged on the one side in the axial direction (the lower side in FIG. 1) with respect to the base 10. The circuit board 60 is supported by the base 10. The circuit board 60 is arranged so as to be parallel to the major surface extending direction of the base 10. That is, the major surface extending direction of the circuit board 60 is perpendicular to the axial direction of the rotor shaft 20.

Figure 6:
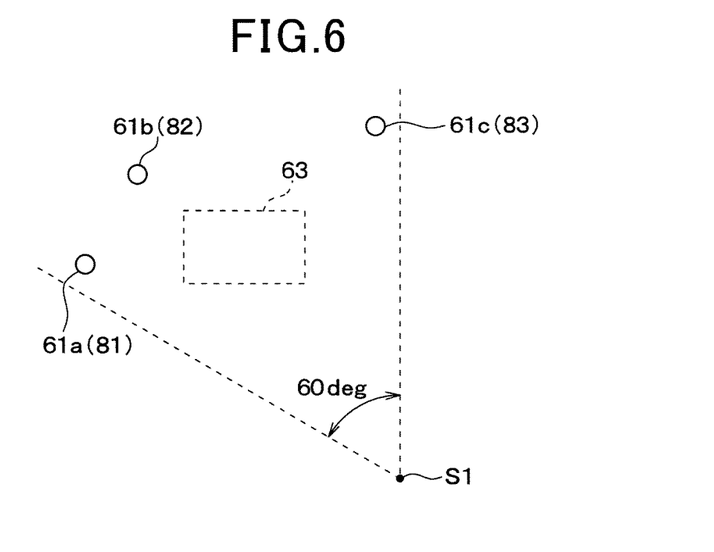
FIG. 6 is a schematic view illustrating the arrangement relationship between the Hall-effect sensors and a control circuit according to the first embodiment.

As shown in FIGS. 1 and 6, in the in-vehicle motor 1, there are provided Hall-effect sensors 61a, 61b and 61c, an inverter circuit 62 and a control circuit 63. The Hall-effect sensors 61a, 61b and 61c, the inverter circuit 62 and the control circuit 63 are mounted on the circuit board 60.

In the present embodiment, on the major surface of the circuit board 60 on the one side in the axial direction (the lower surface in FIG. 1), there are mounted the inverter circuit 62 and the control circuit 63. On the major surface of the circuit board 60 on the other side in the axial direction (the upper surface in FIG. 1), there are mounted the Hall-effect sensors 61a, 61b and 61c. That is, the Hall-effect sensors 61a, 61b and 61c are arranged on the stator coil 49 side of the circuit board 60.

The connector 70 includes a connector housing 71 and a plurality of terminals 72 received in the connector housing 71.

The connector housing 71 is supported by the base 10. The connector housing 71 is comprised of a connector fitting portion 71a and a connector cover portion 71b. The connector fitting portion 71a is arranged on one side in the major surface extending direction of the circuit board 60 (the left side in FIG. 1). The connector fitting portion 71a is configured to be capable of being fitted to another connector.

Figure 4:
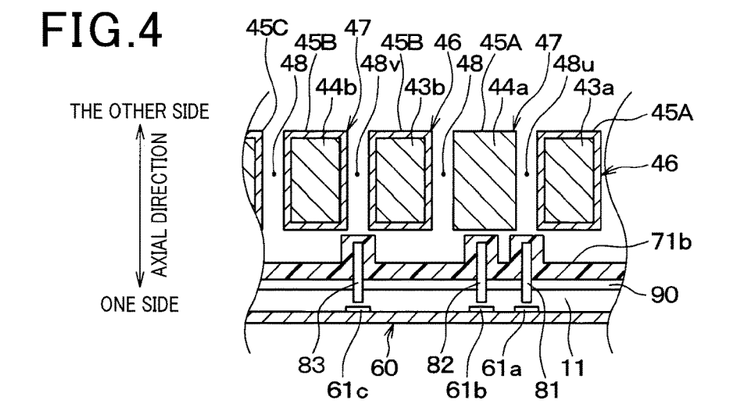
FIG. 4 is a cross-sectional view including the axes of three sensor pins in FIG. 2, illustrating the arrangement relationship between three Hall-effect sensors and the three sensor pins.

The connector cover portion 71b is arranged on the other side in the axial direction with respect to the base 10. As shown in FIGS. 1 and 4, the connector cover portion 71b is formed so as to cover the opening 11 of the base 10 from the other side in the axial direction. The connector cover portion 71b is formed so as to cover sensor pins 81, 82 and 83, which are guide members, from the other side in the axial direction. The connector cover portion 71b supports the sensor pins 81, 82 and 83.

The sensor pins 81, 82 and 83 guide magnetic flux, which emanates from the plurality of magnetic poles of the rotor 50, to corresponding ones of the Hall-effect sensors 61a, 61b and 61c. Specifically, the sensor pin 81 guides the magnetic flux emanating from the plurality of magnetic poles of the rotor 50 to the Hall-effect sensor 61a. The sensor pin 82 guides the magnetic flux emanating from the plurality of magnetic poles of the rotor 50 to the Hall-effect sensor 61b.

The sensor pin 83 guides the magnetic flux emanating from the plurality of magnetic poles of the rotor 50 to the Hall-effect sensor 61c.

Figure 5:
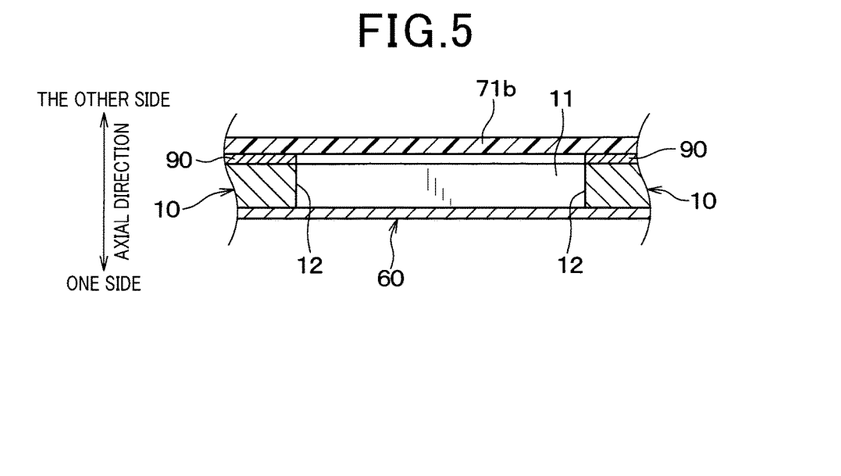
FIG. 5 is a cross-sectional view taken along the line V-V in FIG. 3.

In the present embodiment, between the connector cover portion 71b and the opening formation portion 12 of the base 10, as shown in FIG. 5, there is provided a seal member 90 to seal between the connector cover portion 71b and the opening formation portion 12 of the base 10. The seal member 90 is ring-shaped to enclose the opening 11 between the connector cover portion 71b and the base 10. In the present embodiment, as the seal member 90, for example, a resin material such as silicone or the like may be employed.

In the present embodiment, the connector fitting portion 71a and the connector cover portion 71b are integrally formed of a resin material to constitute the connector housing 71.

The plurality of terminals 72, which electrically connect between external devices and the circuit board 60, each penetrate the connector fitting portion 71a and the connector cover portion 71b.

Specifically, one end of each of the terminals 72 is arranged in the connector fitting portion 71a. The one end of each of the terminals 72 is to be connected, in the connector fitting portion 71a, to another connector. Consequently, the one end of each of the terminals 72 is to be connected, via the other connector, to the external devices. The other end of each of the terminals 72 is connected, in the opening 11 of the base 10, to the circuit board 60.

In the present embodiment, the external devices may include an electronic control device that provides a command signal to the control circuit 63 and a battery that supplies direct current to the inverter circuit 62. That is, the terminals 72 electrically connect between the circuit board 60 and the electronic control device and the battery.

As shown in FIG. 1, the case 80 is arranged on the one side in the axial direction (the lower side in FIG. 1) with respect to the base 10. The case 80 is formed so as to cover the circuit board 60 from the one side in the axial direction. The case 80 and the base 10 together form a housing that receives the circuit board 60. The case 80 is fixed to the base 10 by screws or the like. In the present embodiment, the case 80 is formed of a resin material.

Next, the details of the sensor pins 81, 82 and 83 according to the present embodiment will be described.

Figure 2:
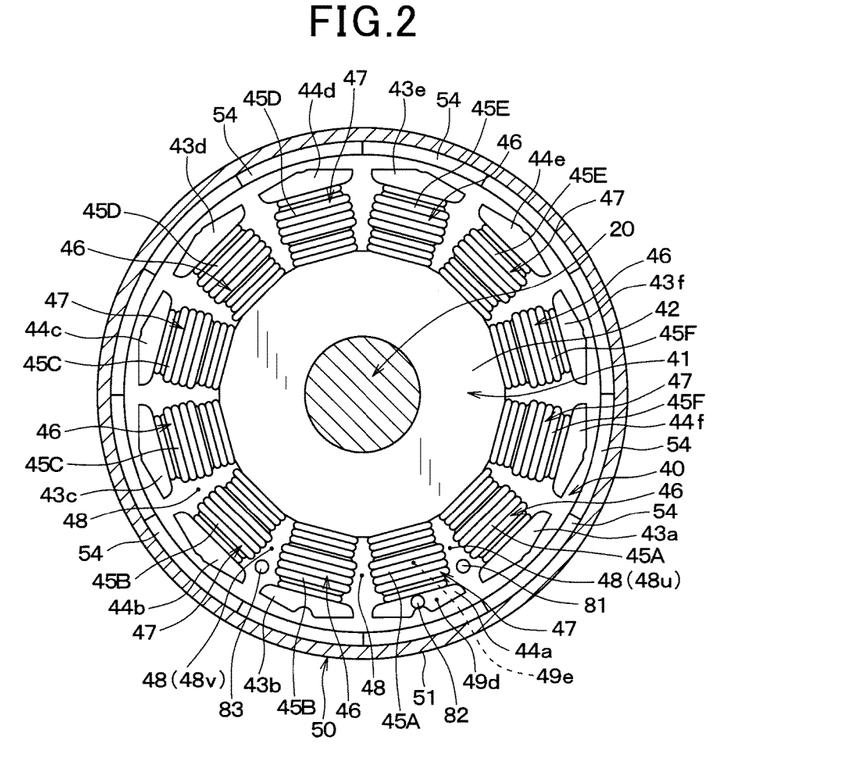
FIG. 2 is a cross-sectional view taken along the line II-II in FIG. 1.
Figure 3:
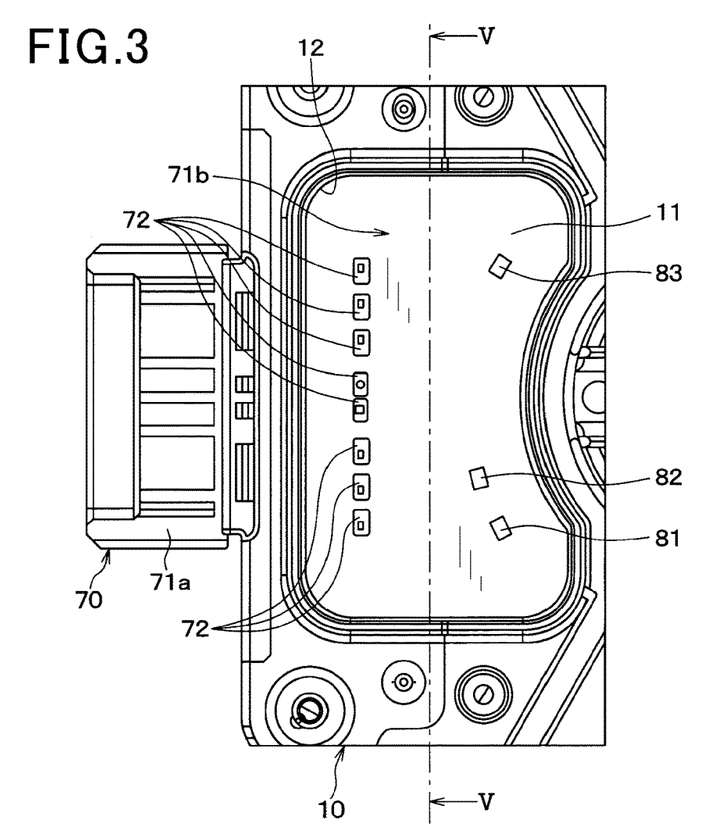
FIG. 3 is a cross-sectional view taken along the line in FIG. 1.

In the present embodiment, as shown in FIGS. 2 and 6, the sensor pins 81, 82 and 83 are arranged so as to be offset from one another in the circumferential direction centering on the axis S. The Hall-effect sensors 61a, 61b and 61c are also arranged so as to be offset from one another in the circumferential direction centering on the axis S. In addition, FIG. 2 is a cross-sectional view taken along the line II-II in FIG. 1, illustrating the arrangement relationship of the sensor pins 81, 82 and 83 with respect to the stator coil 49 while omitting the connector cover 71b, the base 10 and the like.

The sensor pins 81, 82 and 83 have their respective axes extending parallel to the axis Si of the rotor shaft 20. That is, the sensor pins 81, 82 and 83 are formed so as to extend in the axial direction of the rotor shaft 20. The sensor pins 81, 82 and 83 are arranged on the other side in the axial direction with respect to the Hall-effect sensors 61a, 61b and 61c. A portion of each of the sensor pins 81, 82 and 83 on the other side in the axial direction is arranged radially inside the plurality of permanent magnets 54. That is, the portion of each of the sensor pins 81, 82 and 83 on the other side in the axial direction is arranged so as to overlap, when viewed from the radially outside, the plurality of permanent magnets 54.

The sensor pin 81 guides the magnetic flux emanating from the plurality of magnetic poles of the rotor 50 to the Hall-effect sensor 61a.

Specifically, when the slot 48 between the teeth 43a and 44a is viewed in the axial direction, the sensor pin 81 is located at a position overlapping the slot 48 between the teeth 43a and 44a. The winding 45A wound on the tooth 43a constitutes one forward-wound portion 46 of the U-phase winding 49a. The winding 45A wound on the tooth 44a constitutes one reverse-wound portion 47 of the U-phase winding 49a. Hereinafter, for the sake of convenience of explanation, the slot 48 between the forward-wound portion 46 and the reverse-wound portion 47 of the U-phase winding 49a will be referred to as slot 48u. Accordingly, when the slot 48u is viewed in the axial direction, the sensor pin 81 is located at a position overlapping the slot 48u. Hence, the sensor pin 81 is located at a position where magnetic flux emanating from the forward-wound portion 46 of the U-phase winding 49a and magnetic flux emanating from the reverse-wound portion 47 of the U-phase winding 49a are canceled by each other.

Hereinafter, the position where the magnetic flux emanating from the forward-wound portion 46 and the magnetic flux emanating from the reverse-wound portion 47 are canceled by each other will be referred to as first position.

One end of the sensor pin 81 on the one side in the axial direction is located on the other side in the axial direction with respect to the Hall-effect sensor 61a. The other end of the sensor pin 81 on the other side in the axial direction is located on the one side in the axial direction with respect to the slot 48 between the teeth 43a and 44a. Consequently, it is possible to suppress the magnetic fluxes emanating from the U-phase winding 49a from being guided by the sensor pin 81 to the Hall-effect sensor 61a.

The sensor pin 82 guides the magnetic flux emanating from the plurality of magnetic poles of the rotor 50 to the Hall-effect sensor 61b.

Specifically, when a distal end portion of the tooth 44a is viewed in the axial direction, the sensor pin 82 is located at a position overlapping the distal end portion (radially outer end portion) of the tooth 44a. The winding 45A wound on the tooth 44a constitutes one reverse-wound portion 47 of the U-phase winding 49a. The sensor pin 82 is located at a second position 49d which is on the rotor 50 side in the radial direction (i.e., radially outer side) with respect to a winding position 49e; the winding position 49e is a position which overlaps the winding 45A when the winding 45A is viewed in the axial direction. One end of the sensor pin 82 on the one side in the axial direction is located on the other side in the axial direction with respect to the Hall-effect sensor 61b. The other end of the sensor pin 82 on the other side in the axial direction is located on the one side in the axial direction with respect to the distal end portion of the tooth 44a. Therefore, the sensor pin 82 guides, to the Hall-effect sensor 61b, the magnetic flux emanating from the reverse-wound portion 47 of the U-phase winding 49a as a disturbance in addition to the magnetic flux emanating from the plurality of magnetic poles of the rotor 50.

As above, a position where the magnetic flux emanating from one forward-wound portion 46 or reverse-wound portion 47 of any of the three phase windings 49a, 49b and 49c is guided, in addition to the magnetic flux emanating from the plurality of magnetic poles of the rotor 50, to the Hall-effect sensor is referred to as the second position. That is, the second position, which is different from the first position, denotes a position where the magnetic flux emanating from one forward-wound portion 46 or reverse-wound portion 47 of any of the three phase windings is guided to the Hall-effect sensor.

The sensor pin 83 guides the magnetic flux emanating from the plurality of magnetic poles of the rotor 50 to the Hall-effect sensor 61c.

Specifically, when the slot 48 between the teeth 43b and 44b is viewed in the axial direction, the sensor pin 83 is located at a position overlapping the slot 48 between the teeth 43b and 44b. The winding 45B wound on the tooth 43b constitutes one forward-wound portion 46 of the V-phase winding 49b. The winding 45B wound on the tooth 44b constitutes one reverse-wound portion 47 of the V-phase winding 49b. Hereinafter, for the sake of convenience of explanation, the slot 48 between the forward-wound portion 46 and the reverse-wound portion 47 of the V-phase winding 49b will be referred to as slot 48v. Accordingly, when the slot 48v is viewed in the axial direction, the sensor pin 83 is located at a position overlapping the slot 48v.

One end of the sensor pin 83 on the one side in the axial direction is located on the other side in the axial direction with respect to the Hall-effect sensor 61c. The other end of the sensor pin 83 on the other side in the axial direction is located on the one side in the axial direction with respect to the slot 48v. Therefore, the sensor pin 83 is located on the one side in the axial direction with respect to the slot 48v. Hence, the sensor pin 83 is located at a first position where magnetic flux emanating from the forward-wound portion 46 of the V-phase winding 49b and magnetic flux emanating from the reverse-wound portion 47 of the V-phase winding 49b are canceled by each other. Consequently, it is possible to suppress the magnetic fluxes emanating from the V-phase winding 49b from being guided by the sensor pin 83 to the Hall-effect sensor 61c.

In the present embodiment, the sensor pins 81, 82 and 83 configured as above are arranged within a region of 60 degrees in mechanical angle. Accordingly, the Hall-effect sensors 61a, 61b and 61c are also arranged within the region of 60 degrees in mechanical angle on the upper major surface of the circuit board 60. In addition, mechanical angle is angle centering on the axis S (rotation centerline) of the rotor 50 when the Hall-effect sensors 61a, 61b and 61c and the sensor pins 81, 82 and 83 are viewed in the axial direction (see FIG. 6).

In the present embodiment, the sensor pins 81, 82 and 83 are formed of a magnetic material such as iron or the like.

Next, the electric circuit configuration of the in-vehicle motor 1 according to the present embodiment will be described.

The inverter circuit 62 is a well-known drive circuit which is configured with transistors SW1, SW2, SW3, SW4, SW5 and SW6 and flyback diodes D1, D2, D3, D4, D5 and D6.

Specifically, the transistors SW1, SW2 and SW3 are connected to a positive bus 62a. To the positive bus 62a, there is connected a positive terminal of the battery Ba. The transistors SW4, SW5 and SW6 are connected to a negative bus 62b. To the negative bus 62b, there is connected a negative terminal of the battery Ba. The positive bus 62a and the negative bus 62b constitute two power supply input terminals in the inverter circuit 62.

The transistors SW1 and SW4 are serially connected between the positive bus 62a and the negative bus 62b. The transistors SW2 and SW5 are serially connected between the positive bus 62a and the negative bus 62b. The transistors SW3 and SW6 are serially connected between the positive bus 62a and the negative bus 62b.

A common connection terminal T1 between the transistors SW1 and SW4 is connected to the W-phase winding 49c of the stator coil 49. A common connection terminal T2 between the transistors SW2 and SW5 is connected to the V-phase winding 49b of the stator coil 49. A common connection terminal T3 between the transistors SW3 and SW6 is connected to the U-phase winding 49a of the stator coil 49.

In addition, various semiconductor switching elements, such as IGBTs (Insulated Gate Bipolar Transistors) or the like, may be employed as the transistors SW1, SW2, SW3, SW4, SW5 and SW6.

The control circuit 63 is configured with a microcomputer and a memory. The control circuit 63 performs, via the inverter circuit 62, a rotational speed control process in accordance with a computer program stored in advance in the memory. In the rotational speed control process, the control circuit 63 controls, via the inverter circuit 62, the rotational speed of the rotor 50 based on detection signals of the Hall-effect sensors 61a, 61b and 61c.

Next, the rotational speed control process of the control circuit 63 according to the present embodiment will be described with reference to FIG. 8.

Figure 8:
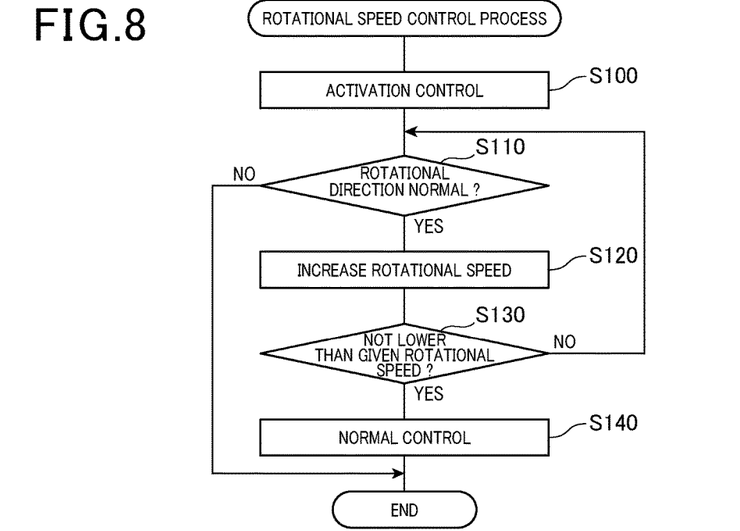
FIG. 8 is a flowchart illustrating a rotational speed control process of a rotor performed by the control circuit of FIG. 7.

FIG. 8 is a flowchart illustrating the rotational speed control process. The control circuit 63 performs the rotational speed control process in accordance with the flowchart of FIG. 8. The rotational speed control process is started according to a command from the electronic control device.

First, at Step 100, the control circuit 63 controls the inverter circuit 62 using a forced commutation method, thereby activating the rotor 50.

Specifically, the control circuit 63 controls the switching of the transistors SW1, . . . , SW6 of the inverter circuit 62, causing the three-phase alternating current to be outputted from the inverter circuit 62 to the stator coil 49. Hence, in the stator coil 49, the U-phase winding 49a, the V-phase winding 49b and the W-phase winding 49c provide a rotating magnetic field respectively to the plurality of magnetic poles of the rotor 50. Consequently, the rotor 50 starts rotating in sync with the rotating magnetic field provided from the stator coil 49.

Next, at Step 110, the control circuit 63 determines, based on the detection signals of the Hall-effect sensors 61a, 61b and 61c, whether the rotational direction of the rotor 50 is a predetermined direction. The predetermined direction is a direction that is set in advance. That is, the control circuit 63 determines whether the rotational direction of the rotor 50 is normal or not.

If the rotational direction of the rotor 50 is determined to be coincident with the predetermined direction, then it is determined that the rotational direction of the rotor 50 is normal. In this case, the determination at Step 110 results in a YES answer and the process proceeds to Step 120.

Next, at Step 120, the control circuit 63 controls the inverter circuit 62 to increase the rotational speed of the rotor 50 to a predetermined rotational speed. Specifically, the control circuit 63 controls the inverter circuit 62, thereby increasing an electric current value of the three-phase alternating current outputted from the inverter circuit 62 to the stator coil 49 while increasing the angular velocity co of the three-phase alternating current. Consequently, the angular velocity co of the rotating magnetic field outputted from the stator coil 49 is increased. Hence, the rotational speed of the rotor 50 is also increased following the angular velocity co of the rotating magnetic field.

Next, at Step 130, the control circuit 63 determines, based on the detection signal of the Hall-effect sensor 61a, whether the rotational speed of the rotor 50 is higher than or equal to a given rotational speed.

Specifically, the control circuit 63 obtains position information of the rotor 50 from the detection signal of the Hall-effect sensor 61a. Then, the control circuit 63 calculates the rotational speed of the rotor 50 by differentiating the obtained position information of the rotor 50 with respect to time. Thereafter, the control circuit 63 determines whether the calculated rotational speed of the rotor 50 is higher than or equal to the given rotational speed.

If the rotational speed of the rotor 50 is lower than the given rotational speed, the determination at Step 130 results in a NO answer. Then, the process returns to Step 110. Thereafter, the YES determination at Step 110, the rotational speed increasing process at Step 120 and the NO determination at Step 130 are repeated as long as the rotational direction of the rotor 50 is the predetermined direction and the rotational speed of the rotor 50 is lower than the given rotational speed.

If the rotational direction of the rotor 50 is the predetermined direction and the rotational speed of the rotor 50 has increased to become higher than or equal to the given rotational speed, the activation of the rotor 50 is determined to be completed and the determination at Step 130 results in a YES answer. That is, the activation control of the rotor 50 using the forced commutation method is completed.

Next, at Step 140, based on a command value from the electronic control device (not shown), the control circuit 63 controls the switching of the transistors SW1, . . . , SW6 of the inverter circuit 62, thereby controlling the rotational speed of the rotor 50. The command value from the electronic control device represents a target rotational speed of the rotor 50.

Specifically, the control circuit 63 obtains the position information of the rotor 50 from the detection signal of the Hall-effect sensor 61a. Then, based on the obtained position information of the rotor 50, the control circuit 63 controls the switching of the transistors SW1, . . . , SW6 of the inverter circuit 62, causing the three-phase alternating current to be outputted from the inverter circuit 62 to the stator coil 49.

At this time, the control circuit 63 obtains the position information of the rotor 50 from the detection signal of the Hall-effect sensor 61a and calculates the rotational speed of the rotor 50 by differentiating the obtained position information with respect to time. Moreover, the control circuit 63 controls the inverter circuit 62 so as to have the calculated rotational speed approach the target rotational speed.

Consequently, the angular velocity co of the three-phase alternating current outputted from the inverter circuit 62 to the stator coil 49 approaches a target angular velocity corn. The target angular velocity corn is an angular velocity in a one-to-one corresponding relationship to the target rotational speed.

Hence, the angular velocity co of the rotating magnetic field outputted from the stator coil 49 approaches the target angular velocity corn. At this time, the rotor 50 rotates following the rotating magnetic field provided from the stator coil 49. Consequently, the rotational speed of the rotor 50 approaches the target rotational speed. That is, it is possible to control the rotational speed of the rotor 50 according to the command value from the electronic control device.

In addition, at above Step 110, if the rotational direction of the rotor 50 is reverse to the predetermined direction, the rotational direction of the rotor 50 is determined to be abnormal and the determination results in a NO answer. Thereafter, the rotational speed control process is started again.

As described above, in the in-vehicle motor 1 according to the present embodiment, the rotor 50 has the plurality of magnetic poles arranged in the circumferential direction and is configured to be rotatable about its axis 51. The stator coil 49 includes the phase windings 49a, 49b and 49c. The phase windings 49a, 49b and 49c respectively constitute the forward-wound portions 46 and the reverse-wound portions 47 for each phase. In the forward-wound portions 46, the copper wire is wound in the forward winding direction. In the reverse-wound portions 47, the copper wire is wound in the reverse direction to the forward winding direction. The forward-wound and reverse-wound portions 46 and 47 of the three phases are arranged in the circumferential direction and disposed radially inside the rotor 50. Each pair of the forward-wound and reverse-wound portions 46 and 47 of the same phase are arranged so as to be adjacent to each other in the circumferential direction. The circuit board 60 has the inverter circuit 62, the control circuit 63 and the Hall-effect sensors 61a, 61b and 61c mounted thereon. The inverter circuit 62 outputs the three-phase alternating current to the stator coil 49 to cause the rotating magnetic field to be outputted from the stator coil 49 to the rotor 50, thereby rotating the rotor 50. The control circuit 63 controls the rotational speed of the rotor 50 via the inverter circuit 62. The Hall-effect sensors 61a, 61b and 61c detect, for detecting the rotational speed and rotational direction of the rotor 50, the magnetic flux emanating from the plurality of magnetic poles of the rotor 50. The sensor pins 81, 82 and 83 guide the magnetic flux emanating from the plurality of magnetic poles of the rotor 50 to corresponding ones of the Hall-effect sensors 61a, 61b and 61c.

The control circuit 63 controls, based on the detection values of the Hall-effect sensors 61a, 61b and 61c, the inverter circuit 62 to activate the rotor 50. After completion of the activation of the rotor 50, the control circuit 63 controls the rotational speed of the rotor 50 based on the detection value of the Hall-effect sensor 61a.

The sensor pin 81 is arranged at a position which overlaps, when viewed in the axial direction, the slot 48u between the forward-wound and reverse-wound portions 46 and 47 of the U-phase winding 49a. The sensor pin 83 is arranged at a position which overlaps, when viewed in the axial direction, the slot 48v between the forward-wound and reverse-wound portions 46 and 47 of the V-phase winding 49b. Hence, each of the sensor pins 81 and 83 is arranged at the first position where the magnetic flux from the forward-wound portion 46 and the magnetic flux from the reverse-wound portion 47 are canceled by each other. Moreover, the sensor pin 82 is located on the radially outer side (i.e., the rotor 50 side in the radial direction) with respect to the winding position 49e; the winding position 49e is a position which overlaps, when viewed in the axial direction, the reverse-wound portion 47 of the U-phase winding 49a. Therefore, compared to the case of arranging the sensor pins 81, 82 and 83 respectively at three first positions, it is possible to arrange the sensor pins 81, 82 and 83 within an even smaller region. Hence, it is possible to arrange the sensor pins 81, 82 and 83 within the region of 60 degrees in mechanical angle. Accordingly, it is also possible to arrange the Hall-effect sensors 61a, 61b and 61c within the region of 60 degrees in mechanical angle. Consequently, it is possible to further reduce the region within which the Hall-effect sensors 61a, 61b and 61c are arranged on the circuit board 60.

In the present embodiment, the Hall-effect sensors 61a, 61b and 61c are arranged on the control circuit 63 side on the circuit board 60. Therefore, it is possible to shorten the distances between the Hall-effect sensors 61a, 61b and 61c and the control circuit 63. Consequently, on the circuit board 60, it is possible to shorten wires between the Hall-effect sensors 61a, 61b and 61c and the control circuit 63.

Accordingly, it is possible to make it difficult for electromagnetic noise to intrude into the wires between the Hall-effect sensors 61a, 61b and 61c and the control circuit 63. Consequently, it is possible to prevent the control circuit 63 from erroneously controlling the rotational speed of the rotor 50.

In the present embodiment, as described above, it is possible to further reduce the region within which the Hall-effect sensors 61a, 61b and 61c are arranged. Therefore, it is possible to reduce the size of the circuit board 60.

In the present embodiment, for determining the rotational direction of the rotor 50, the detection signals of the Hall-effect sensors 61a, 61b and 61c are used. The Hall-effect sensor 61b detects the magnetic flux from the plurality of magnetic poles of the rotor 50 via the sensor pin 82. However, the sensor pin 82 is located at the second position offset from the first positions. Therefore, the sensor pin 82 guides, to the Hall-effect sensor 61b, the magnetic flux from the stator coil 49 as a disturbance in addition to the magnetic flux from the plurality of magnetic poles of the rotor 50. Accordingly, the accuracy of detecting the magnetic flux from the plurality of magnetic poles of the rotor 50 at the Hall-effect sensor 61b is low. Nevertheless, no problem is caused by using the detection signal of the Hall-effect sensor 61b for determination of the rotational direction of the rotor 50.

In the present embodiment, as described above, it is possible to arrange the sensor pins 81, 82 and 83 within the region of 60 degrees in mechanical angle. Therefore, it is possible to reduce the size of the connector cover portion 71b that supports the sensor pins 81, 82 and 83. Consequently, it becomes easy to constitute the connector cover portion 71b by integral formation of the connector housing 71. Hence, it is possible to easily implement a water-proof structure between the base 10 and the connector cover portion 71b.

(Second Embodiment)

In the above first embodiment, an example is illustrated where the sensor pin 81 (or 83) is arranged at a position overlapping the slot 48u (or 48v) in the axial direction. Alternatively, in the present second embodiment, the sensor pin 81 may be arranged as shown in FIG. 9.

Figure 9:
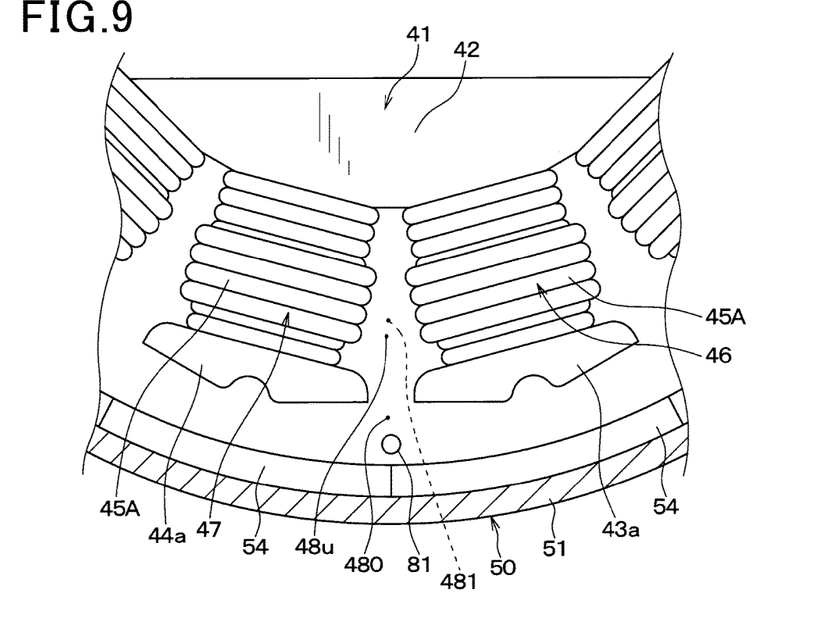
FIG. 9 is a partially cross-sectional view illustrating the arrangement of Hall-effect sensors according to a second embodiment.

Specifically, as shown in FIG. 9, the sensor pin 81 is arranged on the radially outer side (i.e., the rotor 50 side) with respect to a U-phase slot position 481; the U-phase slot position (gap position) 481 is a position which overlaps the slot 48u when the slot 48u is viewed in the axial direction.

In other words, the sensor pin 81 is arranged at a position which overlaps a U-phase rotor-side position 480 when the U-phase rotor-side position 480 is viewed in the axial direction; the U-phase rotor-side position 480 is a position on the radially outer side (i.e., the rotor 50 side) with respect to the slot 48u. Therefore, the sensor pin 81 is arranged at a first position where magnetic flux emanating from the forward-wound portion 46 of the U-phase winding 49a and magnetic flux emanating from the reverse-wound portion 47 of the U-phase winding 49a are canceled by each other.

Similarly, the sensor pin 83 may be arranged on the radially outer side (i.e., the rotor 50 side) with respect to a V-phase slot position (not shown); the V-phase slot position is a position which overlaps the slot 48v when the slot 48v is viewed in the axial direction.

In this case, the sensor pin 83 is arranged at a first position where magnetic flux emanating from the forward-wound portion 46 of the V-phase winding 49b and magnetic flux emanating from the reverse-wound portion 47 of the V-phase winding 49b are canceled by each other.

(Third Embodiment)

In the above first embodiment, an example is illustrated where of the three sensor pins (81, 82, 83), two sensor pins (81, 83) are arranged at the first positions. The present third embodiment, which illustrates an example where of the three sensor pins, only one senor pin 82 is arranged at a first position, will be described with reference to FIG. 10.

Figure 10:
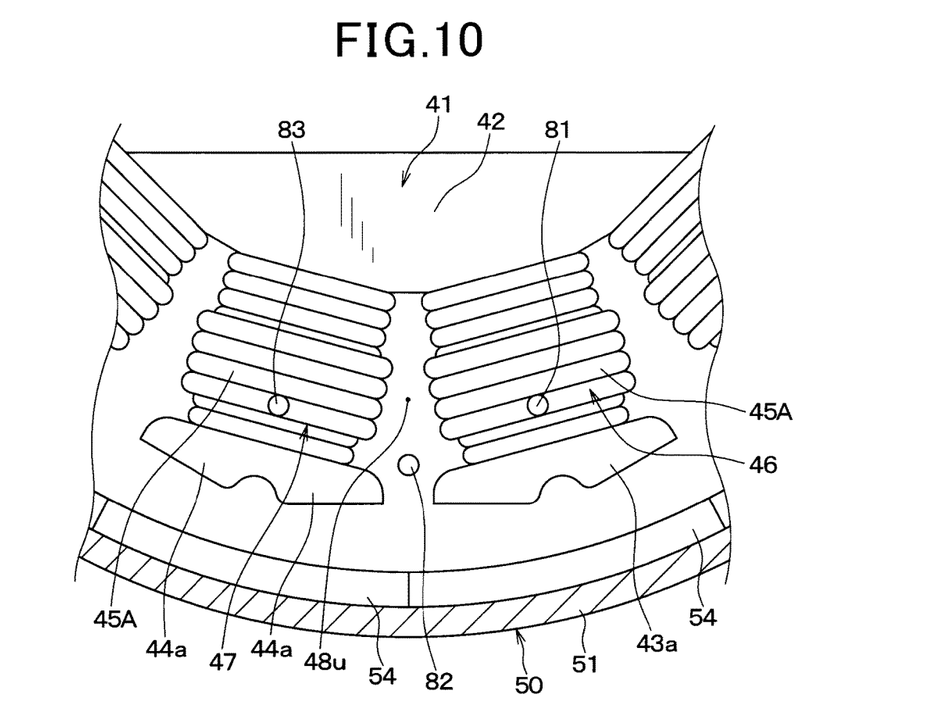
FIG. 10 is a partially cross-sectional view illustrating the arrangement of Hall-effect sensors according to a third embodiment.

In the present third embodiment, the sensor pin 82 is arranged at the first position which overlaps the slot 48u between the forward-wound and reverse-wound portions 46 and 47 of the U-phase winding 49a when the slot 48u is viewed in the axial direction. Therefore, the sensor pin 82 is arranged at the first position where magnetic flux emanating from the forward-wound portion 46 of the U-phase winding 49a and magnetic flux emanating from the reverse-wound portion 47 of the U-phase winding 49a are canceled by each other.

The sensor pins 81 and 83 are arranged at second positions that are different from the first position. Specifically, the sensor pin 81 is arranged at the second position which overlaps the forward-wound portion 46 of the U-phase winding 49a (i.e., the winding 45A wound on the tooth 43a) when the forward-wound portion 46 of the U-phase winding 49a is viewed in the axial direction. Therefore, the sensor pin 81 guides, to the Hall-effect sensor 61a, the magnetic flux emanating from the forward-wound portion 46 of the U-phase winding 49a in addition to the magnetic flux emanating from the plurality of magnetic poles of the rotor 50.

The sensor pin 83 is arranged at the second position which overlaps the reverse-wound portion 47 of the U-phase winding 49a (i.e., the winding 45A wound on the tooth 44a) when the reverse-wound portion 47 of the U-phase winding 49a is viewed in the axial direction. Therefore, the sensor pin 83 guides, to the Hall-effect sensor 61c, the magnetic flux emanating from the reverse-wound portion 47 of the U-phase winding 49a in addition to the magnetic flux emanating from the plurality of magnetic poles of the rotor 50.

In the present embodiment, with the above configuration, the control circuit 63 detects, based on the detection value of the Hall-effect sensor 61b that detects the magnetic flux guided by the sensor pin 82, the position information of the rotor 50 and thus the rotational speed of the rotor 50. Moreover, the control circuit 63 detects, based on the detection values of the Hall-effect sensors 61a, 61b and 61c, the rotational direction of the rotor 50; then the control circuit 63 determines whether the detected rotational direction is normal or not.

(Other Embodiments)

(1) In the above-described first, second and third embodiments, examples are illustrated where an electric motor according to the present invention is the in-vehicle motor 1. Alternatively, an electric motor according to the present invention may also be applied to machines and devices other than motor vehicles. That is, an electric motor according to the present invention may also be applied to transportation machines (airplanes, trains) other than motor vehicles or stationary devices. An electric motor according to the present invention may also be applied to machines and devices other than electric fans.

(2) In the above-described first, second and third embodiments, examples are illustrated where the Hall-effect sensors 61*a*, 61*b* and 61*c* are employed for detecting the magnetic flux emanating from the rotor 50.

Alternatively, various magnetic sensors other than the Hall-effect sensors 61*a*, 61*b* and 61*c* may be employed for detecting the magnetic flux emanating from the rotor 50.

(3) In the above-described first embodiment, an example is illustrated where the position of the rotor 50 is detected using the detection value of the Hall-effect sensor 61*a* which is one of the Hall-effect sensors 61*a*, 61*b* and 61*c*. Alternatively, the position of the rotor 50 may be detected as follows.

That is, the position of the rotor 50 may be detected using the detection values of those two Hall-effect sensors 61*a* and 61*c* of the Hall-effect sensors 61*a*, 61*b* and 61*c* which respectively detect the magnetic fluxes guided by the sensor pins 81 and 83. As described above, the sensor pins 81 and 83 are arranged at the first positions.

In this case, after completion of the activation of the rotor 50, the control circuit 63 detects position information of the rotor 50 based on the detection signal of the Hall-effect sensor 61*a*; the control circuit 63 also detects position information of the rotor 50 based on the detection signal of the Hall-effect sensor 61*c*. Moreover, the control circuit 63 performs control of the rotational speed of the rotor 50 using an average value of the position information of the rotor 50 obtained from the detection signal of the Hall-effect sensor 61*a* and the position information of the rotor 50 obtained from the detection signal of the Hall-effect sensor 61*c*.

(4) In the above-described first, second and third embodiments, examples are illustrated where the rotor 50 are arranged radially outside the stator 40. Alternatively, the rotor 50 may be arranged radially inside the stator 40.

(5) In the above-described first, second and third embodiments, examples are illustrated where the U-phase winding 49*a*, the V-phase winding 49*b* and the W-phase winding 49*c* are star-connected to constitute the stator coil 49. Alternatively, the U-phase winding 49*a*, the V-phase winding 49*b* and the W-phase winding 49*c* may be A-connected to constitute the stator coil 49.

(6) In the above-described first, second and third embodiments, examples are illustrated where an electric motor according to the present invention is a three-phase synchronous motor. Alternatively, an electric motor according to the present invention may be an N-phase synchronous motor, where N is an integer greater than or equal to 4. Otherwise, an electric motor according to the present invention may be a two- phase synchronous motor.

(7) In the above-described first, second and third embodiments, examples are illustrated where a portion of each of the sensor pins 81, 82 and 83 on the other side in the axial direction is arranged so as to overlap, when viewed from the radially outside, the plurality of permanent magnets 54. However, the arrangement of the sensor pins 81, 82 and 83 is not limited to the above and may be as follows. That is, the sensor pins 81, 82 and 83 may be arranged so as to be offset from the plurality of permanent magnets 54 in the axial direction.

(8) In the above-described first embodiment, an example is illustrated where the two sensor pins 81 and 83 are arranged at the positions which respectively overlap the slots 48 (48*u*, 48*v*) each between one pair of the forward-wound and reverse-wound portions 46 and 47 of the same phase when the slots 48 (48*u*, 48*v*) are viewed in the axial direction. Alternatively, the following arrangements (a) and (b) may be employed.

Here, for the sake of convenience of explanation, the positions, which respectively overlap the slots 48 (48*u*, 48*v*) each between one pair of the forward-wound and reverse-wound portions 46 and 47 of the same phase when the slots 48 (48*u*, 48*v*) are viewed in the axial direction, are referred to as the same-phase slot positions. Moreover, positions, which are on the rotor 50 side in the radial direction with respect to the respective same-phase slot positions, are referred to as the same-phase slot rotor-side positions.

(a) One of the two sensor pins 81 and 83 is arranged at one of the same-phase slot positions whereas the remaining sensor pin is arranged at one of the same-phase slot rotor-side positions.

(b) Each of the two sensor pins 81 and 83 is arranged at one of the same-phase slot rotor-side positions.

(9) In the above-described first embodiment, an example is illustrated where the sensor pin 82 is arranged at the second position 49*d* (see FIG. 2) which is on the rotor 50 side in the radial direction with respect to the winding position 49*e*. Alternatively, the sensor pin 82 may be arranged as follows.

That is, the sensor pin 82 may be arranged at a position which overlaps the winding wound on one of the teeth 43*a*, 43*b*, 43*c*, 43*d*, 43*e*, 43*f*, 44*a*, 44*b*, 44*c*, 44*d*, 44*e* and 44*f* when the winding is viewed in the axial direction.

(10) In the above-described third embodiment, an example is illustrated where the sensor pins 81 and 83 are arranged the positions each of which overlaps the winding wound on one of the teeth 43*a*, . . . , 43*f*, 44*a*, . . . , 44*f* when the winding is viewed in the axial direction. Alternatively, the following arrangements (c) and (d) may be employed.

Here, for the sake of convenience of explanation, the positions, each of which overlaps the winding wound on one of the teeth 43*a*, . . . , 43*f*, 44*a*, . . . , 44*f* when the winding is viewed in the axial direction, are referred to as winding positions. Moreover, positions, which are on the rotor 50 side in the radial direction with respect to the respective winding positions, are referred to as winding rotor-side positions.

(c) One of the sensor pins 81 and 83 is arranged at one of the winding positions whereas the remaining sensor pin is arranged at one of the winding rotor-side positions.

(d) Each of the sensor pins 81 and 83 is arranged at one of the winding rotor-side positions.

(11) In the above-described third embodiment, an example is illustrated where the sensor pin 82 is arranged at the position (hereinafter, to be referred as U-phase slot position) which overlaps the slot 48*u* (see FIG. 10) between the forward-wound and reverse-wound portions 46 and 47 of the U-phase winding 49*a* when the slot 48*u* is viewed in the axial direction. Alternatively, the sensor pin 82 may be arranged on the rotor 50 side in the radial direction with respect to the U-phase slot position.

(12) In addition, the present invention is not limited to the above-described embodiments; modifications may be suitably made without departing from the spirit of the present invention. Further, the embodiments are not irrelevant to each other; they may be suitably combined with each other unless the combination is obviously impossible. Moreover, in the above-described embodiments, elements constituting the embodiments are not necessarily essential unless they are particularly specified as being essential or can be considered to be obviously essential in principle. Moreover, in the above-described embodiments, when numerical values, such as the numbers, values, quantities or ranges of the constituting elements of the embodiments, are mentioned, the present invention is not limited to the particular numerical values unless they are particularly specified as being essential or the present invention is obviously limited to the particular numerical values in principle. Moreover, in the above-described embodiments, when the shapes or positional relationships of the constituting elements are mentioned, the present invention is not limited to the particular shapes or positional relationships unless they are particularly specified as being essential or the present invention is obviously limited to the particular shapes or positional relationships in principle.

Next, the correspondence between various means of the present invention and the constituting elements of the above-described embodiments will be described.

The first determination means corresponds to Step 110.
The second determination means corresponds to Step 130.
The rotational speed control means corresponds to Step 140.

DESCRIPTION OF REFERENCE SIGNS

1: in-vehicle motor (electric motor)
10: base (support member)
11: opening
20: rotor shaft
40: stator
41: stator core
46: forward-wound portions
47: reverse-wound portions
48: slots (gaps)
49: stator coil
49a: U-phase winding (phase winding)
49b: V-phase winding (phase winding)
49c: W-phase winding (phase winding)
50: rotor
60: circuit board (substrate)
61a, 61b, 61c: Hall-effect sensors (magnetic sensors)
62: inverter circuit (drive circuit)
63: control circuit
70: connector
71: connector housing
71b: connector cover portion (cover member)
72: terminals
81, 82, 83: sensor pins (guide members)
90: seal member

The invention claimed is:

1. An electric motor comprising:
a rotor having a plurality of magnetic poles arranged in a circumferential direction and being configured to be rotatable about an axis;
a stator coil including phase windings of a plurality of phases, the phase windings constituting, for each phase, a forward-wound portion in which an electric wire is wound in a forward winding direction and a reverse-wound portion in which the electric wire is wound in a reverse direction to the forward winding direction, the forward-wound and reverse-wound portions of the plurality of phases being arranged in the circumferential direction;
a substrate having a drive circuit, a control circuit and three magnetic sensors mounted thereon, the drive circuit being configured to output, for rotating the rotor, alternating current to the stator coil and thereby cause a rotating magnetic field to be outputted from the stator coil to the plurality of magnetic poles, the control circuit being configured to control the drive circuit, the three magnetic sensors being configured to detect, for detecting rotation of the rotor, magnetic flux from the plurality of magnetic poles; and
three guide members provided to guide the magnetic flux emanating from the plurality of magnetic poles respectively to the three magnetic sensors, at least one of the three guide members being arranged at a first position where magnetic fluxes respectively emanating from one pair of the forward-wound and reverse-wound portions of the same phase are canceled by each other, at least one of the three guide members other than the at least one guide member arranged at the first position being arranged at a second position, the second position being different from the first position,
wherein
the control circuit controls, based on detection values of the three magnetic sensors, the drive circuit to activate the rotor, and
after completion of the activation of the rotor, the control circuit controls rotational speed of the rotor based on the detection values of at least one of the three magnetic sensors which detects the magnetic flux guided by the at least one guide member arranged at the first position.

2. The electric motor as set forth in claim 1, wherein the three magnetic sensors and the three guide members are arranged within a region of 60 degrees in mechanical angle.

3. The electric motor as set forth in claim 1, wherein the second position is a position which overlaps one of the forward-wound and reverse-wound portions of the plurality of phases when the one of the forward-wound and reverse-wound portions is viewed in an axial direction of the rotor.

4. The electric motor as set forth in claim 1, wherein the second position is located, in a radial direction of the rotor, on the rotor side with respect to a winding position, and
the winding position is a position which overlaps one of the forward-wound and reverse-wound portions of the plurality of phases when the one of the forward-wound and reverse-wound portions is viewed in an axial direction of the rotor.

5. The electric motor as set forth in claim 1, wherein the three magnetic sensors are arranged on one side of the stator coil in an axial direction of the rotor, and
the three guide members are respectively arranged between the stator coil and the three magnetic sensors in the axial direction of the rotor.

6. The electric motor as set forth in claim 1, wherein the forward-wound and reverse-wound portions of the same phase are arranged in the circumferential direction with a gap formed therebetween, and
the first position is a position which overlaps the gap when the gap is viewed in an axial direction of the rotor.

7. The electric motor as set forth in claim 1, wherein the forward-wound and reverse-wound portions of the same phase are arranged in the circumferential direction with a gap formed therebetween,
the first position is located, in a radial direction of the rotor, on the rotor side with respect to a gap position, and
the gap position is a position which overlaps the gap when the gap is viewed in an axial direction of the rotor.

8. The electric motor as set forth in claim 1, wherein three guide members are arranged so as to be offset from one another in the circumferential direction, and the control circuit comprises:

a first determination means for determining, based on the detection values of the three magnetic sensors, whether the rotational direction of the rotor is a predetermined direction;

a second determination means for determining, based on the detection values of the at least one of the three magnetic sensors which detects the magnetic flux guided by the at least one guide member arranged at the first position, whether the rotational speed of the rotor is higher than or equal to a predetermined rotational speed; and a rotational speed control means for determining, when the rotational direction of the rotor is determined by the first determination means to be the predetermined direction and the rotational speed of the rotor is determined by the second determination means to be higher than or equal to the predetermined rotational speed, that the activation of the rotor is completed and controlling the rotational speed of the rotor based on the detection values of the at least one of the three magnetic sensors which detects the magnetic flux guided by the at least one guide member arranged at the first position.

9. The electric motor as set forth in claims 1 wherein the substrate is arranged on one side of the stator coil in an axial direction of the rotor, and the three magnetic sensors are arranged on the stator coil side of the substrate.

10. The electric motor as set forth in claim 9, further comprising:

a cover member that is arranged between the substrate and the stator coil in the axial direction of the rotor and formed so as to cover the three guide members from the stator coil side;

a support member that is arranged between the cover member and the substrate in the axial direction of the rotor, has an opening formation portion forming an opening and supports the substrate and the cover member; and a seal member that is formed, between the support member and the cover member, in a ring shape enclosing the opening and seals between the opening formation portion of the support member and the cover member, wherein all of the three guide members are arranged in the opening.

11. The electric motor as set forth in claim 10, further comprising a connector that includes a terminal and a connector housing, the terminal having one end connected to the substrate and the other end to be connected to an external device, the connector housing receiving the terminal therein, wherein the cover member is constituted of the connector housing.

* * * * *

UNITED STATES PATENT AND TRADEMARK OFFICE
CERTIFICATE OF CORRECTION

PATENT NO. : 10,432,067 B2
APPLICATION NO. : 15/752738
DATED : October 1, 2019
INVENTOR(S) : Taishi Iwanaga et al.

It is certified that error appears in the above-identified patent and that said Letters Patent is hereby corrected as shown below:

On the Title Page

Please correct as follows:
Item (71) Applicants:
DENSO CORPORATION, Kariya, Aichi-pref. (JP)

Item (73) Assignees:
DENSO CORPORATION, Kariya (JP)

Signed and Sealed this
Third Day of December, 2019

Andrei Iancu
*Director of the United States Patent and Trademark Office*